United States Patent
Matsuzaki

(10) Patent No.: US 6,651,332 B2
(45) Date of Patent: Nov. 25, 2003

(54) METHOD FOR MANUFACTURING HEAT TRANSFER MEMBER

(75) Inventor: Toyoaki Matsuzaki, Shizuoka-Ken (JP)

(73) Assignee: Xenesys Inc. (JP)

( * ) Notice: Subject to any disclaimer, the term of this patent is extended or adjusted under 35 U.S.C. 154(b) by 0 days.

(21) Appl. No.: 10/024,176

(22) Filed: Dec. 21, 2001

(65) Prior Publication Data
US 2002/0078565 A1 Jun. 27, 2002

(30) Foreign Application Priority Data
Dec. 22, 2000 (JP) ..................................... P2000-390868

(51) Int. Cl.$^7$ .............................................. B21D 53/04
(52) U.S. Cl. ............................. 29/890.039; 29/890.053; 29/890.054; 29/407.04; 29/407.08; 29/407.1; 29/430; 29/463; 29/727
(58) Field of Search ...................... 29/890.039, 890.053, 29/890.054, 407.01, 407.04, 407.05, 407.09, 407.1, 407.08, 418, 429, 430, 463, 464, 705, 720, 779, 781, 787, 795, 559, 727, 33 D; 72/819; 228/103, 233.2, 262.1, 9, 8, 183; 219/86.1, 59.1; 165/170, 166, 177

(56) References Cited

U.S. PATENT DOCUMENTS

| | | | | |
|---|---|---|---|---|
| 3,762,031 A | * | 10/1973 | Jonason et al. | 228/160 |
| 4,562,630 A | * | 1/1986 | Larsson | 29/890.039 |
| 4,846,268 A | * | 7/1989 | Beldam et al. | 165/153 |
| 5,768,782 A | * | 6/1998 | Kato | 29/890.053 |
| 6,470,570 B2 | * | 10/2002 | Prater et al. | 29/890.053 |
| 6,484,398 B2 | * | 11/2002 | Mori et al. | 29/890.053 |

FOREIGN PATENT DOCUMENTS

JP 56-91942 * 7/1981

* cited by examiner

Primary Examiner—Gregory Vidovich
Assistant Examiner—T. Nguyen
(74) Attorney, Agent, or Firm—Rader, Fishman & Grauer PLLC

(57) ABSTRACT

A method for manufacturing a heat transfer member comprises the steps of: subjecting elongated materials to be worked, which are made of metallic thin sheets, to a continuous press forming utilizing a plurality of press-forming devices to form heat transfer faces each having a prescribed shape, while transferring the materials in a prescribed feeding direction, which is in parallel with a longitudinal direction of the materials; and welding two materials, which have been subjected to the press forming, of the elongated materials together utilizing a welding device to form a heat transfer member having substantially a tubular shape. The method further comprises the steps of: forming flat members each having a prescribed width on longitudinally extending opposite edge portions of the materials to be worked so as to make a difference in level from a longitudinally extending central portion thereof by means of each of the press-forming devices; placing the two materials one upon another so that the flat members of the two materials come into contact with each other, while holding the flat members of the two materials and transferring the two materials, which have been placed one upon another without causing deviation of the heat transfer faces, to a next step with a use of a transferring device, which is provided after the press-forming devices; and temporarily securing the flat members of the two materials, which have been placed one upon another, at a plurality of positions, and then, welding continuously and longitudinally the flat members on inner sides in a transverse direction relative to temporarily secured positions to combine the two materials together, with a use of the welding device, thereby forming the heat transfer member having the tubular shape and opposite opening ends in a longitudinal direction.

20 Claims, 8 Drawing Sheets

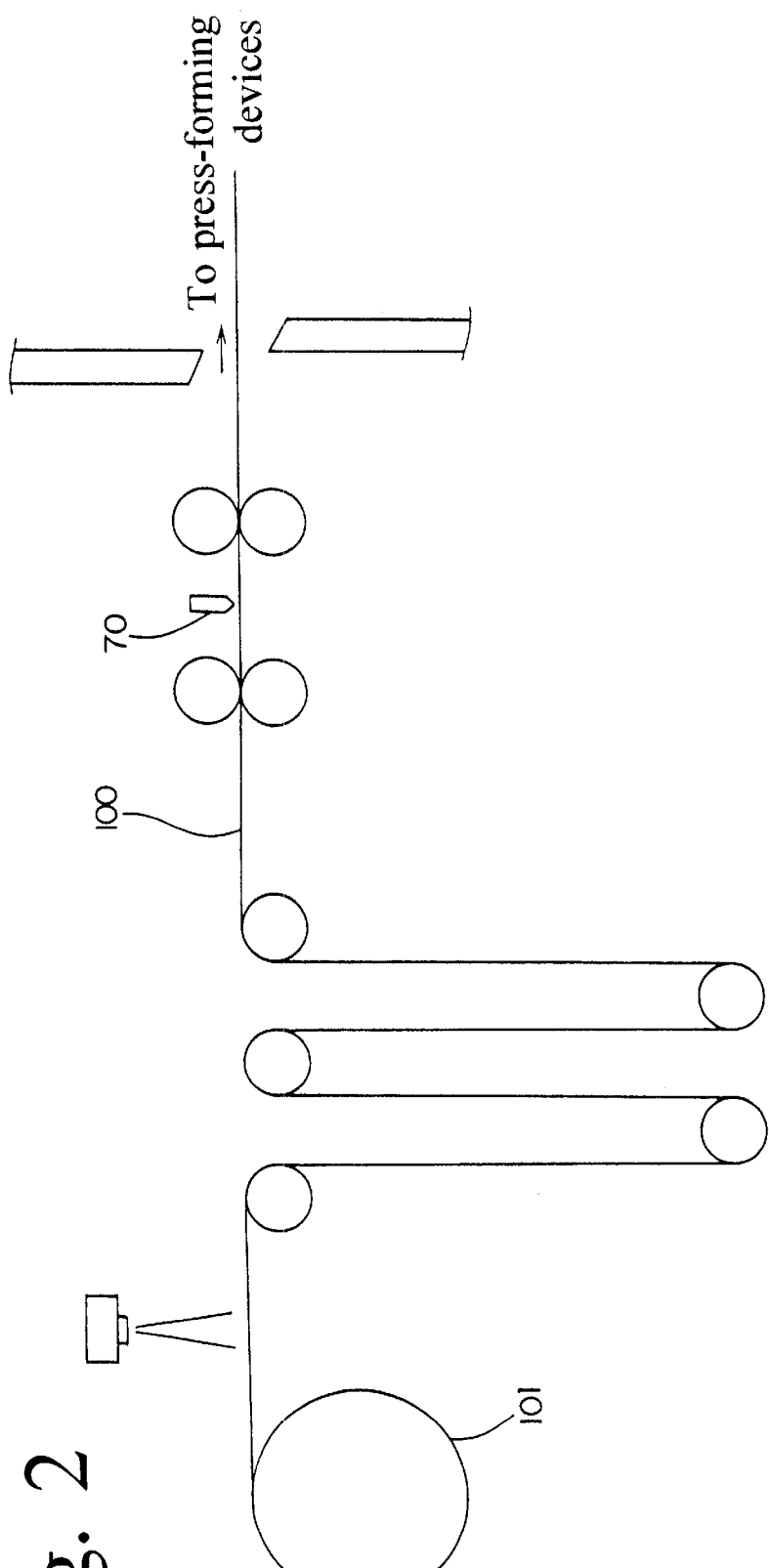

METHOD FOR MANUFACTURING HEAT TRANSFER MEMBER

BACKGROUND OF THE INVENTION

1. Field of the Invention

The present invention relates to a method for manufacturing a heat transfer member for a heat exchanger by press forming and then welding a plurality of materials to be worked, and specifically to a method for manufacturing efficiently the heat transfer member by subjecting the material to be worked to the press forming and the welding in a continuous manner.

2. Description of the Related Art

The heat transfer member of the heat exchanger, which is generally formed of a metallic sheet, is press-formed into a prescribed shape and then welded as an occasion demands, thus providing a finished product, which is to be put into practice. With respect to manufacture of the heat transfer member with the use of the press-forming device, a set of metallic molds have conventionally been used. More specifically, the material to be worked is held between the molds. Motion of moving the molds closely to each other has formed a pattern of irregularities serving as the heat transfer face on the metallic thin sheet of the material to be worked.

With respect to manufacture of the heat transfer member through a welding method, which is carried after the press forming, a welding device such as a seam-welding device has conventionally been used. Portions of the materials to be welded are welded to form the heat transfer member, while holding the materials with the use of the welding device.

The manufacture of the heat transfer member has conventionally been carried out in this manner. In a case where the heat transfer member is formed into a tubular shape, which is obtained by welding the opposite side edge portions of two materials to be worked, there is added a step for placing the two materials to be worked one upon another prior to the welding. In such a step, the two materials to be worked, which have been subjected to the press forming, are placed one upon another so that the surfaces thereof having the same shape face each other. Then, the two materials to be worked are transferred into the welding device in such a state.

When there is included the step for placing the two materials to be worked one upon another, portions to be press-formed of the heat transfer faces of the materials to be worked may easily be deviated from each other. It becomes more difficult to provide a proper state in which the materials to be worked are accurately placed one upon another, according as the materials to be worked become larger. Under such circumstances, in the conventional method for manufacturing a large-sized heat transfer member, there has not as yet been established automation of a series of steps of transferring the two materials to be worked from the press-forming device, placing them one upon another in an appropriate manner and transferring them in such a state to the welding step. It has therefore been impossible to improve the efficiency of the manufacturing operation of the heat transfer member, thus causing problems.

SUMMARY OF THE INVENTION

An object of the present invention, which was made to solve the above-mentioned problems, is therefore to provide a method for manufacturing a heat transfer member, which permits an appropriate positional adjustment for elongated materials to be worked, which have been subjected to a press forming and perform an appropriate welding on them so as to manufacture efficiently a large-sized heat transfer member.

In order to attain the aforementioned object, a method of the present invention for manufacturing a heat transfer member comprises the steps of:

subjecting elongated materials to be worked, which are made of metallic thin sheets, to a continuous press forming utilizing a plurality of press-forming devices to form heat transfer faces each having a prescribed shape, while transferring the materials in a prescribed feeding direction, which is in parallel with a longitudinal direction of the materials; and welding two materials, which have been subjected to the press forming, of said elongated materials together utilizing a welding device to form a heat transfer member having substantially a tubular shape, wherein:

said method further comprising the steps of:

forming flat members each having a prescribed width on longitudinally extending opposite edge portions of said materials to be worked so as to make a difference in level from a longitudinally extending central portion thereof by means of each of said press-forming devices;

placing the two materials one upon another so that the flat members of the two materials come into contact with each other, while holding said flat members of the two materials and transferring the two materials, which have been placed one upon another without causing deviation of the heat transfer faces, to a next step with a use of a transferring device, which is provided after said press forming devices; and temporarily securing the flat members of the two materials, which have been placed one upon another, at a plurality of positions, and then, welding continuously and longitudinally said flat members on inner sides in a transverse direction relative to temporarily secured positions to combine the two materials together, with a use of said welding device, thereby forming the heat transfer member having the tubular shape and opposite opening ends in a longitudinal direction.

In the present invention, the press forming is applied to the longitudinally extending central portion of the elongated material to be worked by means of the press-forming device, while forming the flat members on the longitudinally extending opposite edge portions of the material. The transferring device holds the flat members of the two materials, which have been subjected to the press forming, and transfers them to the welding device, while placing them one upon another in an appropriate manner. The flat members of the two materials are then welded by means of the welding device to form the heat transfer member. Continuous application of a series of steps from the press forming step to the welding step to the materials to be worked makes it possible to automatically and continuously manufacture the heat transfer members, thus remarkably improving the manufacturing efficiency and reducing the manufacturing cost for the heat transfer members. In addition, even when the elongated materials to be worked have a large size, it is possible to transfer them to the welding device in a reliable manner. Accordingly, it is possible to manufacture easily a heat exchanger, which has the large heat transfer member to enhance the heat exchanger effectiveness. The materials to be worked are temporarily secured to each other and then welded by means of the welding device. It is therefore possible to prevent deviation of the positions to be welded, perform an accurate welding and improve accuracy of the shape of the heat transfer member after being welded.

In the second aspect of the present invention, as an occasion demands, said transferring device may transfer the material, which has been subjected to the press forming utilizing the press-forming device, from the press-forming devices, temporarily hold it in a certain place, transfer a new material, which has been subjected to the press forming utilizing said press-forming device after the press forming of said material, and then place the material as temporarily held and the new material one upon another so that the flat members of the materials come into contact with each other.

According to the features of the second aspect of the present invention, the two materials, which have been press-formed by means of the same press-forming device, conveyed to the transferring device, and then placed one upon another, are used as a set of materials to be worked, which are to be welded together to form the heat transfer member. Accordingly, there may be used a combination of the single press-forming device and the single transferring device. It is therefore unnecessary to use a plurality of press-forming devices, thus reducing the manufacturing cost. Use of the materials to be worked, which have been press-formed by means of the same press-forming device, makes the difference in the shape of the materials to be worked remarkably small, thus improving accuracy of the shape of the heat transfer member as manufactured.

In the third aspect of the present invention, as an occasion demands, said transferring device may turn any one of the material as temporarily held and the new material utilizing a turning device, and then place the two materials one upon another with one of them turned over. According to the features of the third aspect of the present invention, any one of the two materials, which have been press-formed by means of the same press-forming device, and then conveyed to the transferring device, is turned over by means of the turning device to provide an invented relationship of the opposite surfaces and moved in a parallel direction in such a state to a position in which it can be placed on the other material. The two materials are then placed one upon another. It is therefore possible to place the two materials one upon another without changing the facing direction of the other material, thus permitting the simplification of a mechanism for placing the materials to be worked one upon another. In a case where the material as temporarily held is turned over, it is possible to turn over the material when the next material is press-formed and transferred, reducing a period of time required to place the two materials one upon another. Consequently, it is possible to reduce a period of time required to transfer the materials from the press-forming device to the welding device, thus permitting manufacture of the heat transfer member in a short period of time.

In the fourth aspect of the present invention, as an occasion demands, there may be adopted features wherein a marking device puts a described mark in at least one prescribed position on a surface of a prescribed region of the flat member of said material so as to provide a relative positional relationship to a portion of each of the materials, to which the press forming is to be applied, prior to the press forming of the material utilizing said press-forming device; and said transferring device is provided with an imaging unit for imaging opposite outer surfaces of the materials, which have been placed one upon another, said transferring device causing said imaging unit to image the two materials, which have been placed one upon another, making a positional adjustment of each of the materials, while obtaining positions of said mark, and placing the two materials one upon another without causing deviation of the heat transfer faces so that the positions of said marks of the materials coincide with two prescribed standard positions, which have previously been set for the two materials to be symmetrical relative to a central line of a transfer passage of the transferring device. According to the features of the fourth aspect of the present invention, the marking device puts the mark in the prescribed position on the flat member of the material prior to the press forming by means of the press-forming device. The imaging unit of the transferring device takes an image of the two materials, which have been placed one upon another by means of the transferring device, to obtain information on the positions of the marks. The positional adjustment of the materials is made so that the positions of the marks coincide with the standard positions as previously set. Accordingly, the materials can be placed one upon another without causing deviation of the heat transfer faces. Namely, it is possible to place the two materials one upon another in an appropriate positional relationship during transfer of the materials from the press-forming device to the welding device. It is therefore possible to convey the materials as placed to the welding device so as to carry out a proper welding operation, thus improving accuracy of the shape of the heat transfer member. In addition, the proper positional adjustment can be made by merely causing the positions of the marks to coincide with the standard positions. Consequently, a positional adjustment can be made rapidly to reduce a period of time required to transfer the materials from the press-forming device to the welding device, thus permitting manufacture of the heat transfer member in a short period of time.

In the fifth aspect of the present invention, as an occasion demands, the method may further comprise the steps of: putting a plurality of prescribed marks, which define welding positions of the materials, on the surface of the material, with the use of a marking device, prior to welding of the materials with the use of said welding device; and applying, after detection of the marks of the materials to be transferred utilizing a mark detection device, spot-welding to prescribed portions of the materials, which are defined by the marks, to temporarily secure the materials, and then applying seam-welding to prescribed portions on the inner sides of the flat members in the transverse direction relative to spot-welded portions, with the use of said welding device. According to the features of the fifth aspect of the present invention, the marking device puts the marks for indicating the positions to be welded, prior to the welding. The mark detection device detects the marks, while the welding device operates to weld the materials in accordance with the detected marks. After the spot-welding is applied to the portions of the materials on which the mars have been put, the seam-welding is applied to the materials without forming any gap between them. Consequently, the welding device can operate to weld the materials in the prescribed portions on the basis of the obtained information on the positions of the materials, which are to be welded, thus permitting a precise adjustment of the welding positions. The materials are temporarily secured to each other and then spot-welded so as to conduct accurately the next step for seam-welding them in appropriate positions, thus improving accuracy of the shape of the heat transfer member after being welded.

In the sixth aspect of the present invention, as an occasion demands, the method may further comprise the steps of: inspecting existence of flaws due to the press forming from an image of the surface of the material utilizing an appearance inspection device, immediately after press forming the material with the use of the press-forming device conducting subsequent steps for the material in a case where no flaws are inspected, and stopping the steps of placing the materials one upon another and welding them in a case where the flaws are inspected. According to the features of the sixth aspect of the present invention, the appearance inspection device inspects existence of flaws due to the press forming, immediately after press forming the material with the use of the press-forming device. When the flaws are inspected, no further steps are applied to the materials so as to avoid a case where the heat transfer member is identified as a failed product due to the flaws, which are discovered after the welding of the materials by means of the welding device, resulting in waste of the materials. It is possible to supply the materials, which have no defects such as flaws, to the welding device, thus preventing the defects from being erroneously left on the heat transfer member and ensuring safety.

In the seventh aspect of the present invention as an occasion demands, the method may further comprise the steps of: immediately after welding the materials with the use of the welding device, obtaining distribution of temperature of the welded portions of the materials and analyzing the distribution of temperature utilizing an inspection device to inspect existence of improperly welded portions, conducting subsequent steps for the material in a case where no improperly welded portions are inspected, and stopping the subsequent steps for the material in a case where the improperly welded portions are inspected. According to the features of the seventh aspect of the present invention, the inspection device obtains information on the distribution of temperature of the welded portions of the materials to inspect the existence of improperly welded portions. When the improperly welded portions are inspected, all subsequent steps are halted so as to prevent the heat transfer member, which has been welded in an improper manner, from being erroneously supplied to the subsequent step. Accordingly, only the heat transfer members, which have been welded in a proper manner, can be conveyed to the subsequent steps, thus safety of the product. In addition, obtainment of the distribution of temperature suffices to make a rapid inspection, thus making it unnecessary to stay the objects to be inspected for a long period of time as in a radiographic inspection device, and reducing remarkably the period of time required for manufacture of the heat transfer member.

In the eighth aspect of the present invention, as an occasion demands, the method may further comprise the steps of: inspecting the materials with the use of the inspection device, closing, after completion of the inspection results in no improperly welded portions of the materials, the opposite opening ends of the heat transfer member formed of the materials and applying a prescribed pressure to an inside of the heat transfer member, and recognizing a pressure proof property up to a prescribed pressure of the heat transfer member with a use of a pressure test device, judging the heat transfer member as a good product in a case where the pressure proof property is recognized, and judging the heat transfer member as a failed product in a case where the pressure proof property is not recognized. According to the features of the eighth aspect of the present invention, there is provided a state in which the prescribed pressure is applied to the inside of the heat transfer member, which has been judged to be proper on the basis of the inspection by means of the above-mentioned inspection device. The pressure proof property of the heat transfer member is checked with the use of the pressure test device. When the sufficient pressure proof property is not recognized, the heat transfer member is judged as a failed product so as to prevent the heat transfer member, which has neither sufficient pressure resistance nor sufficient sealing property due to improper manufacturing steps, from being supplied as a finished product. It is therefore possible to provide only the heat transfer members, which satisfy the requirements for the finished product, thus ensuring safety of the product.

BRIEF DESCRIPTION OF THE DRAWINGS

FIG. 2 is a descriptive view illustrating a state in which materials to be worked are supplied in accordance with the method for manufacturing the heat transfer member of the embodiment of the present invention;

DETAILED DESCRIPTION OF THE PREFERRED EMBODIMENTS

Figure 1:
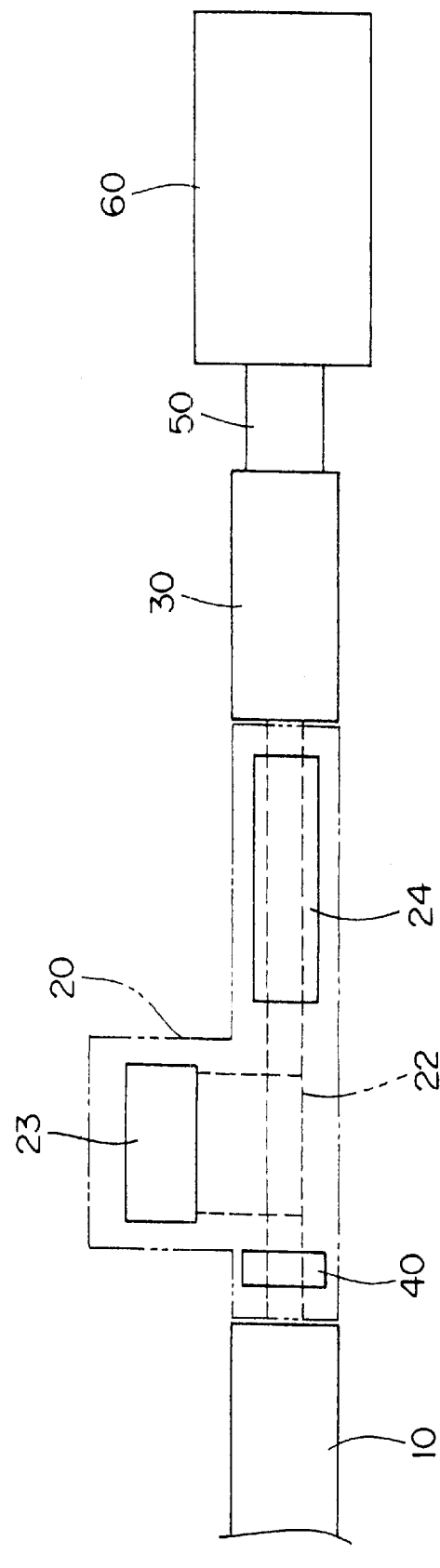
FIG. 1 is a descriptive view of an arrangement of devices for carrying out manufacturing steps in accordance with a method for manufacturing a heat transfer member of an embodiment of the present invention.
Figure 3A:
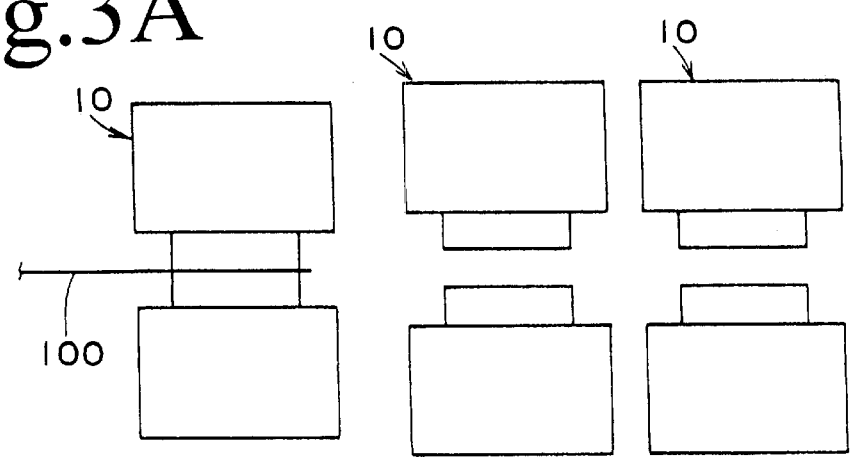
FIG. 3 is a descriptive view illustrating a step for press forming the materials to be worked in accordance with the method for manufacturing the heat transfer member of the embodiment of the present invention.
Figure 3B:
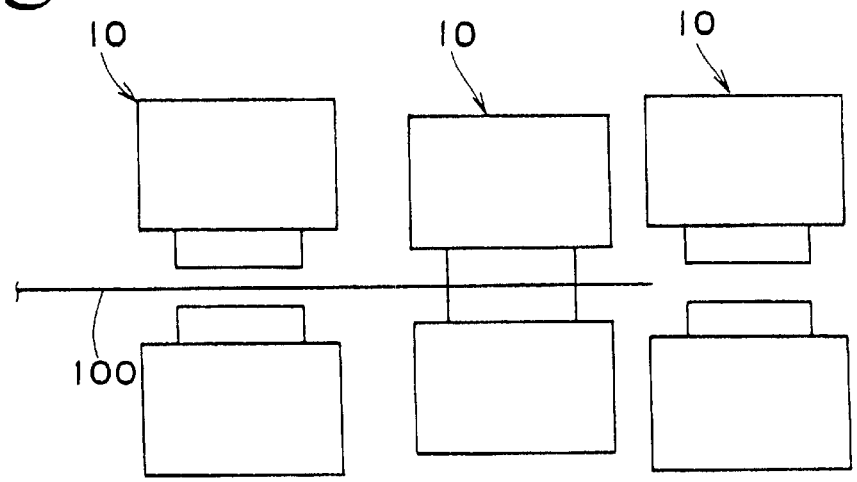
Figure 3C:
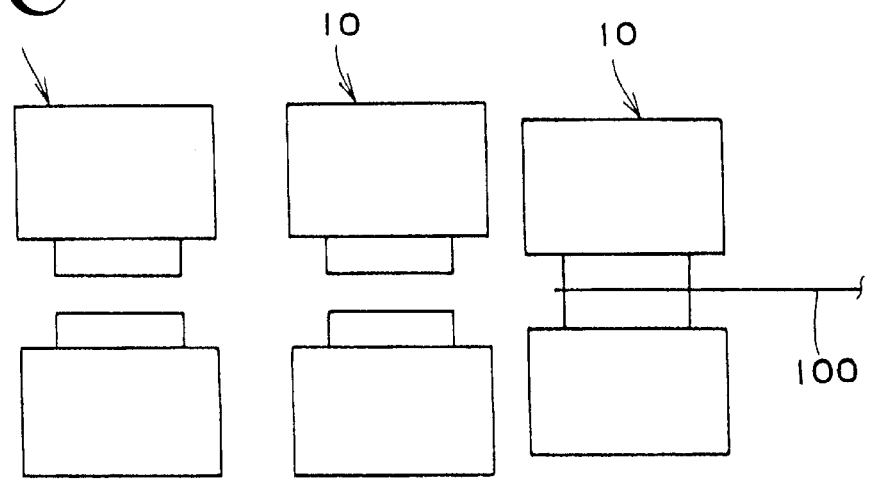
Figure 4:
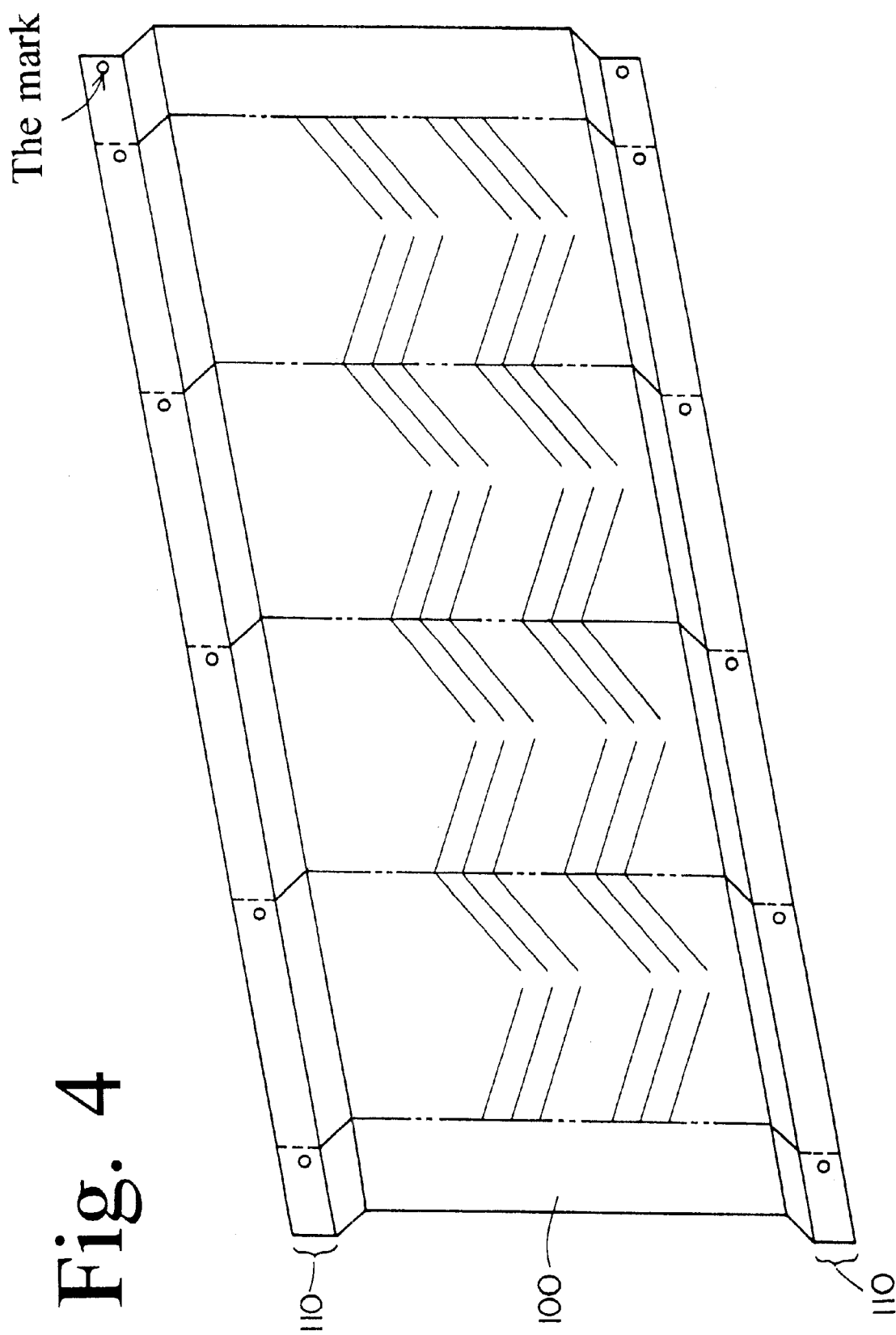
FIG. 4 is a descriptive view illustrating a state in which the materials to be worked have already been press-formed in accordance with the method for manufacturing the heat transfer member of the embodiment of the present invention.
Figure 5:
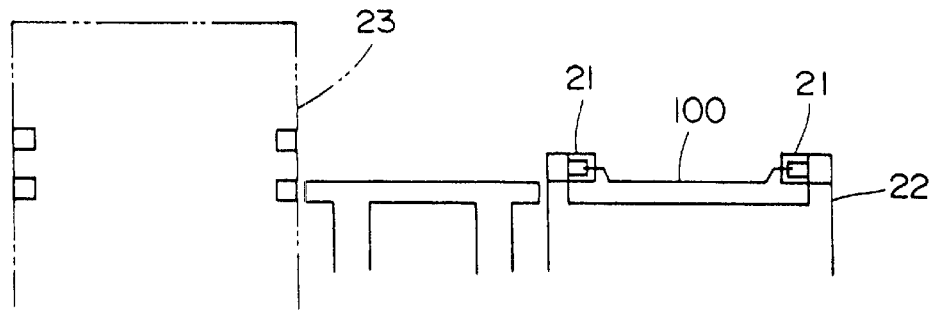
FIG. 5 is a descriptive view illustrating a turning-over operation in a step for transferring the materials to be worked, in accordance with the method for manufacturing the heat transfer member of the embodiment of the present invention.
Figure 5B:
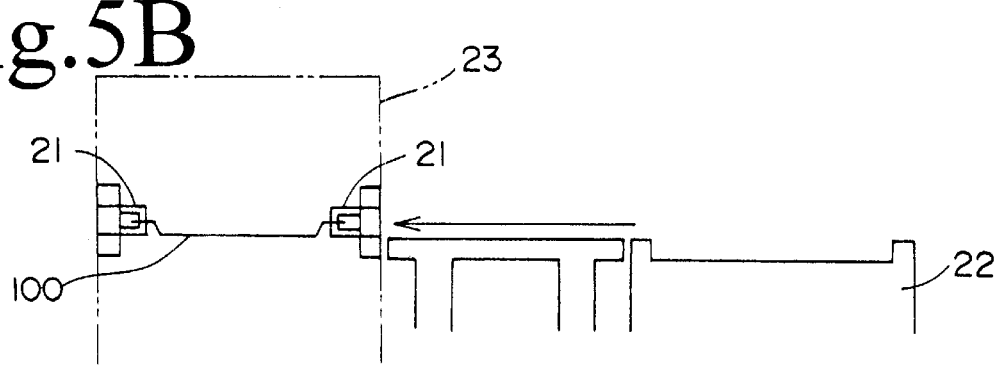
Figure 5:
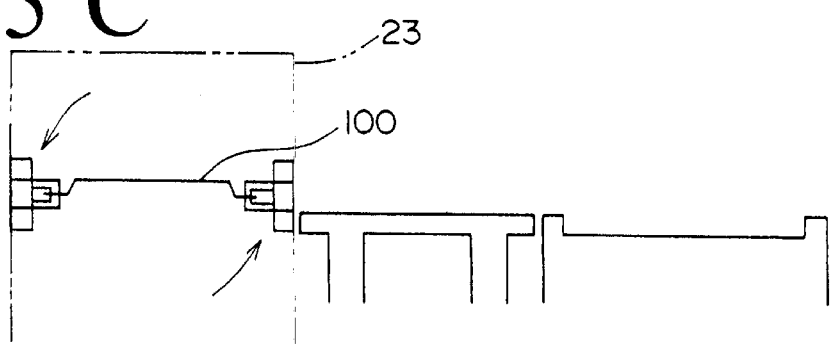
Figure 5D:
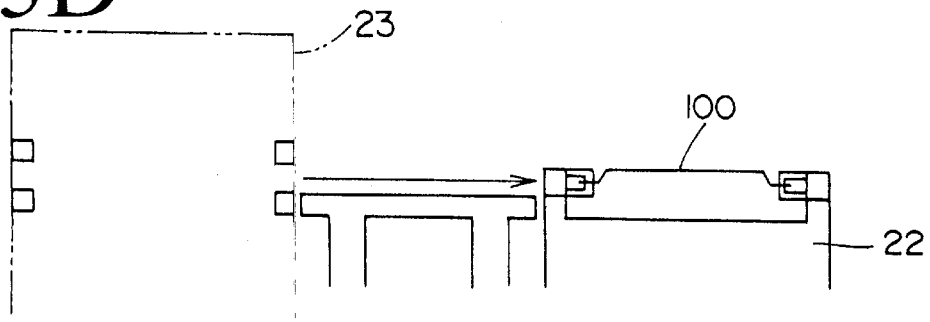
Figure 6:
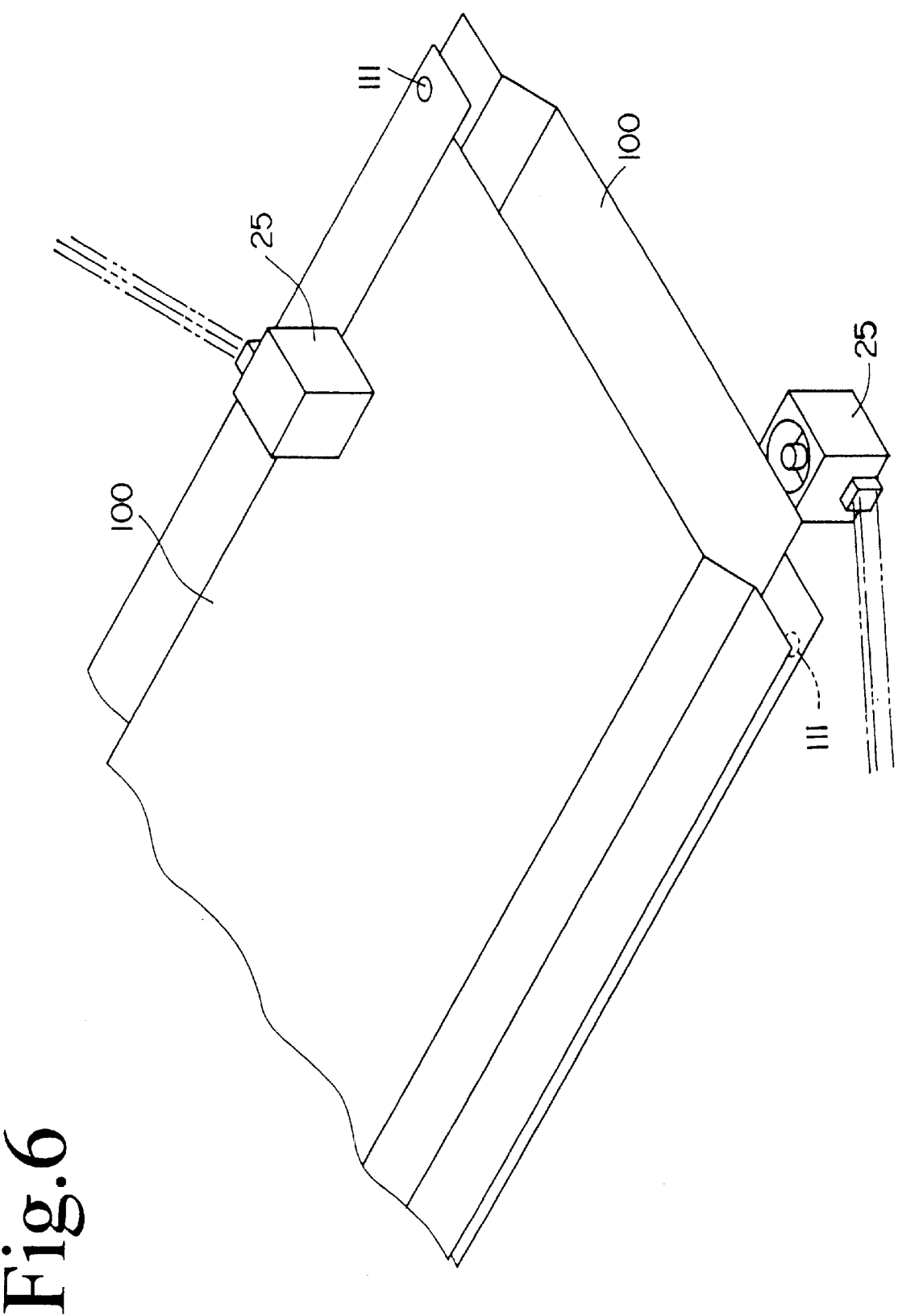
FIG. 6 is a descriptive view illustrating a state in which an image of the materials to be worked is obtained, in the step for transferring the materials to be worked, in accordance with the method for manufacturing the heat transfer member of the embodiment of the present invention.
Figure 7A:
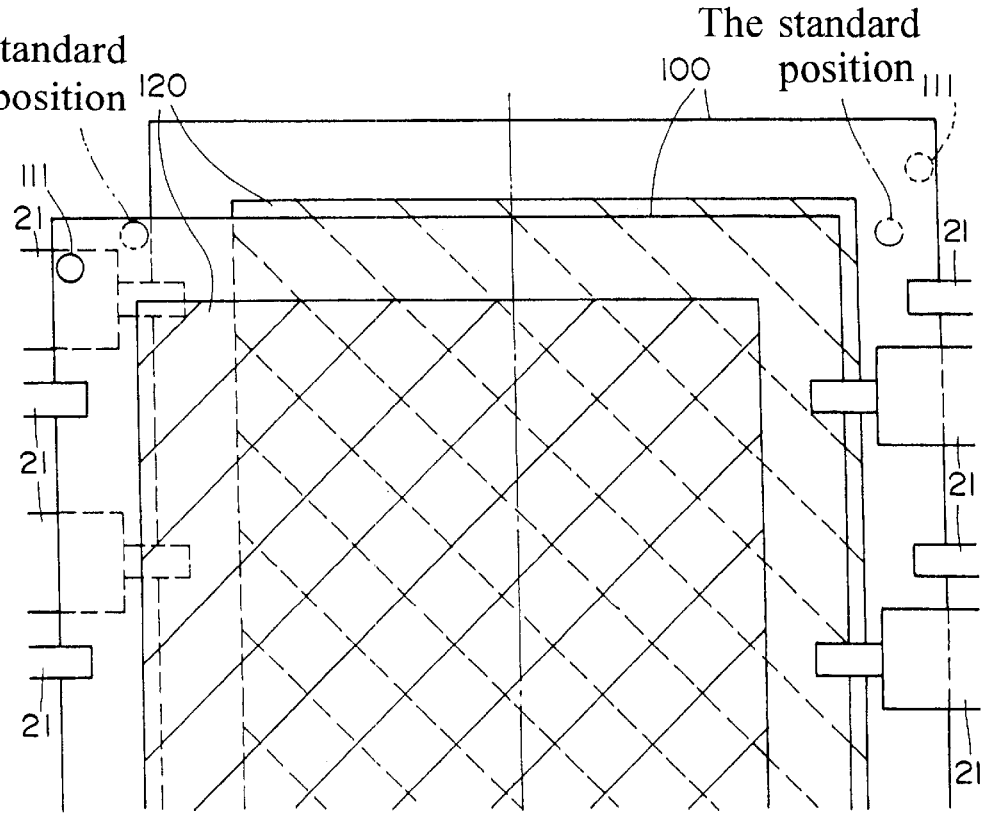
FIG. 7 is a descriptive view illustrating an operation for placing the materials to be worked one upon another, in the step for transferring the materials to be worked, in accordance with the method for manufacturing the heat transfer member of the embodiment of the present invention.
Figure 7B:
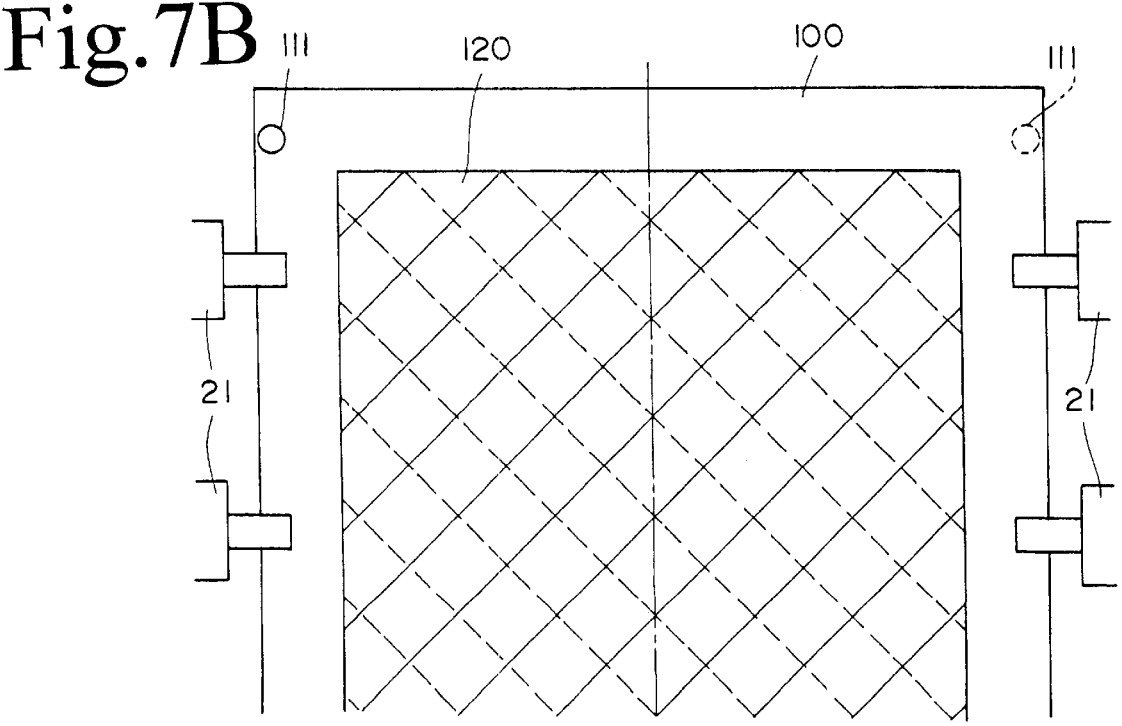
Figure 8:
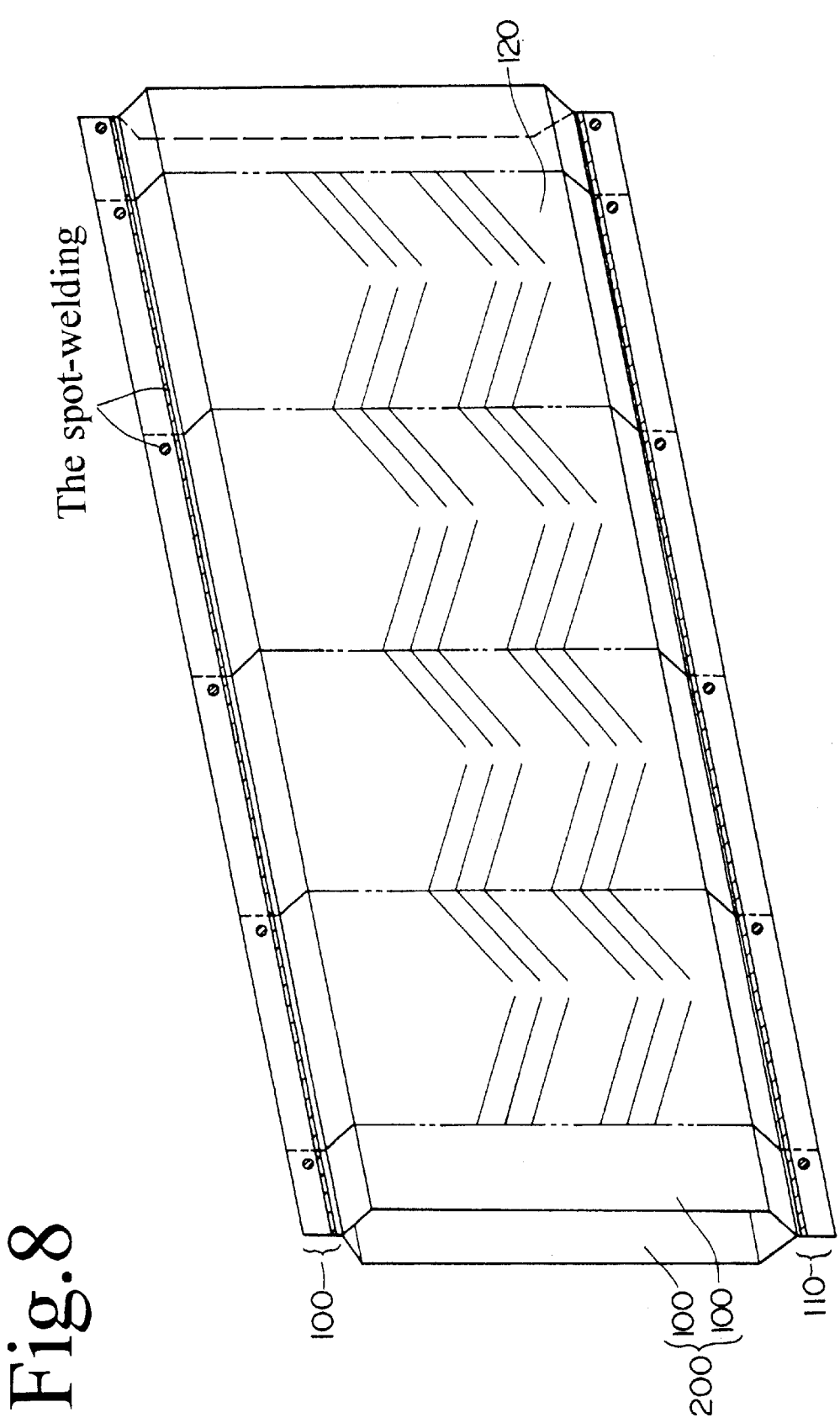
FIG. 8 is a descriptive view illustrating a state in which the materials to be worked have been welded in accordance with the method for manufacturing the heat transfer member of the embodiment of the present invention.

Now, an embodiment of the present invention will be described in detail below with reference to FIGS. 1 to 8. FIG. 1 is a descriptive view of arrangement of devices for carrying out manufacturing steps in accordance with a method for manufacturing a heat transfer member of an embodiment of the present invention; FIG. 2 is a descriptive view illustrating a state in which materials to be worked are supplied in accordance with the method for manufacturing the heat transfer member of the embodiment of the present invention; FIG. 3, consisting of FIGS. 3A, 3B, 3C, is a descriptive view illustrating a step for press forming the materials to be worked in accordance with the method for manufacturing the heat transfer member of the embodiment of the present invention; FIG. 4 is a descriptive view illustrating a state in which the materials to be worked have already been press-formed in accordance with the method for manufacturing the heat transfer member of the embodiment of the present invention; FIG. 5, consisting of FIGS. 5A, 5B, 5C, and 5D, is a descriptive view illustrating a turning-over operation in a step for transferring the materials to be worked, in accordance with the method for manufacturing the heat transfer member of the embodiment of the present invention; FIG. 6 is a descriptive view illustrating a state in which an image of the materials to be worked is obtained, in the step for transferring the materials to be worked, in accordance with the method for manufacturing the heat transfer member of the embodiment of the present invention; FIG. 7, consisting of FIGS. 7A and 7B, is a descriptive view illustrating an operation for placing the materials to be worked one upon another, in the step for transferring the materials to be worked, in accordance with the method for manufacturing the heat transfer member of the embodiment of the present invention; and FIG. 8 is a descriptive view illustrating a state in which the materials to be worked have been welded in accordance with the method for manufacturing the heat transfer member of the embodiment of the present invention.

As is clear from the FIGS. 1 to 8, the method of the embodiment of the present invention for manufacturing the heat transfer member comprises the steps of (i) subjecting elongated materials 100 to be worked, which are made of metallic thin sheets, to a continuous press forming utilizing a plurality of press-forming devices 10 to form a heat transfer face having a prescribed shape on a longitudinally extending central portion of each of the materials as well as flat members on the longitudinally extending opposite edge portions of each of them, while transferring the materials in a prescribed feeding direction, which is in parallel with the longitudinal direction of the materials 100, (ii) placing the two materials 100 to be worked, which have been subjected to the press forming, one upon another so that the flat members of the two materials 100 come into contact with each other and transferring the two materials 100 to a welding device 30 for carrying out the next step with the use of a transferring device 20 and (iii) welding prescribed portions of the flat members of the two materials 100, which have been placed one upon another, without forming any gap between them, utilizing the welding device 30 to form a united body, thereby manufacturing a heat transfer member 2 having a tubular shape.

Each of the press-forming devices used in the embodiment of the present invention has upper and lower molds for forming the heat transfer face on the material 100 to be worked. More specifically, the upper and lower molds permit the continuous formation of a prescribed pattern of irregularities serving as the heat transfer face on the longitudinally extending central portion of the material 100 to be worked as well as the flat members each having a prescribed width on the longitudinally extending opposite edge portions of the material 100 to be worked so as to make a difference in level from the longitudinally extending central portion thereof (see FIG. 4). The press-forming device 10 is provided with a mark detection device (not shown) for detecting marks, which have previously been put on the material 100 to indicate positions to which the press forming is to be applied. After the mark detection device detects the marks on the surface of the material 100 to be worked, the press forming is applied to the prescribed portions of the material 100 to be worked.

Each of the flat members 110 of the material 100 to be worked, which has been subjected to the press forming, has a holding portion and a welding portion. Consequently, the material 100 to be worked can be held on its opposite longitudinally extending sides so as to permit it to be transferred and subjected to the other working steps without causing any adverse influences on the heat transfer face.

The transferring device 20, which is provided in the downstream side of the press-forming device 10 in the traveling direction of the materials 100 to be worked, transfers the material 100 to be worked, which has been subjected to the press forming, from the press-forming device 10 to the welding device 30. The transferring device 20 has a holding unit 21, a transferring passage 22, a reversing unit 23 and a lapping unit 24. The holding unit 21 holds the longitudinally extending side edges of the flat portions 110 of the material 100 to be worked. The transferring passage 22 conveys the material 100 together with the holding unit 21, from the press-forming device 10 to the welding device 30. The reversing unit 23 alternately picks the material 100 from the transferring passage 22, temporarily holds it in a certain place and returns it to the transferring passage 22, while turning over it. The lapping unit 24 places the material 100, which has been transferred by means of the transferring passage 22 and then turned over, on the other material 100, which has been newly transferred from the press-forming device 10, and causes the holding unit 21 to hold the two materials 100 in a lapped state and transfers them.

In addition, the transferring device is provided with two imaging units 25, which can image the upper surface of the upper material 100 and the lower surface of the lower material 100 on which the upper material 100 has been placed, respectively. These imaging units 25 image the two materials 100 to be worked, respectively, to obtain the positional relationship of the two materials 100. The lapping unit 24 places vertically the two materials 100 one upon another on the basis of the positional relationship as obtained so as to prevent deviation of the heat transfer faces 120 of the two materials 100.

Further, there is provided in a transferring-starting position immediately after the press-forming device 10, from which the material 100 is transferred, an appearance inspection device 40 for inspecting the surface conditions of the material 100. Images obtained by the appearance inspection device 40 are analyzed to judge whether or not defects such as flaws due to the press forming exist on the surface of the material 100. In a case where defects exist on the material 100, the steps that are to be carried out to utilize the transferring device 20 and the welding device 30 are stopped and such a material 100, having the aforementioned defects, is discharged from the line as it is.

The welding device 30 to which the materials 100 is transferred by means of the transferring device 20, spot-welds the side edge portions of the flat members 110 of the two materials 100, which have been placed one upon another utilizing the transferring device 20, at a plurality of positions of them to temporarily secure them, and then seam-welds continuously and longitudinally the flat members 110 on the inner sides in the transverse direction relative to the spot-welded positions to combine the two materials together. The heat transfer member 200 having the tubular shape and opposite opening ends in its longitudinal direction is prepared in this manner.

The welding device 30 is provided with the mark detection device (not shown) for detecting the marks, which have previously been put on the material 100. The spot-welding and the seam-welding are applied to the prescribed positions, which are defined on the material 100 by the marks.

There is provided on the downstream side of the welding device 30 in the traveling direction of the material 100 an inspection device 50 for obtaining distribution of temperature of the welded portions of the materials 100 immediately after welding with the use of the welding device 30 and analyzing the distribution of temperature to inspect existence of improperly welded portions. It is therefore judged whether or not the subsequent steps should be applied to the heat transfer member 200 made of the materials 100 on the basis of the inspection results of the existence of the improperly welded portions.

In addition, there is provided on the downstream side of the inspection device 50 in the traveling direction of the material 100 a pressure test device 60 for closing the opposite opening ends of the heat transfer member 200, applying the prescribed pressure to the inside of the heat transfer member 200 and recognizing a pressure proof property up to the prescribed pressure of the heat transfer member 200. In a case where the inspection, obtained by means of an inspection utilizing the inspection device 50, results in the discovery of no improperly welded portions of the heat transfer member 200, a pressure proof confirmatory operation up to the above-mentioned prescribed pressure is applied to the heat transfer member 200 to judge whether or not the quality of the heat transfer member 200 serving as the finished product is satisfied.

There is provided on the upstream side of the press-forming device 10 in the. traveling direction of the materials 100 a marking device 70 for putting a plurality of marks on the surface of the materials 100, which define positions of the materials 100 to which the press forming is to be applied and determine positions of the materials 100 to which the welding is to be applied. The marking device 70 puts prescribed marks 111, which serve as standard positions on the basis of which the positional adjustment is made utilizing the lapping unit 24 of the transferring device 20, on a plurality of prescribed positions of each of the materials 100 so as to provide a constant relative relationship in position to the portions, which are located on the prescribed regions of the surface of the flat portions 110 of the material 100 and to which the press forming is to be applied.

Now, description will be given below of the steps for manufacturing the heat transfer member in accordance with the method of the embodiment of the present invention. There is assumed that the material 100 having no defects, which has been uncoiled from a coil 101 by a length by which the heat transfer member can be manufactured, is supplied.

First, the marking device 70 puts the marks on the surface of the material 100 to be worked. Such a material 100 is supplied to the press-forming device 10. The marks are put on the longitudinally extending opposite edge portions of the material 100 at prescribed intervals in its longitudinal direction so as to provide positional adjustment marks for the lapping unit 24 and welding mark on the basis of which the welding is carried out, in addition to pressing marks on the basis of which the press forming is carried out.

After putting the marks on the material 100 to be worked, the material 100 is transferred by means of a material feeding unit (not shown) so that the one end of the material 100, which is the front end in its traveling direction, is inserted between the upper and lower molds of the press-forming device 10. At this time, the operation for detecting the marks on the material 100, which indicates the positions to which the press forming is to be applied, utilizing the mark detection device (not shown) starts.

When the portion of the material 100, to which the press forming is to be applied, is moved to the place between the molds of the corresponding press-forming device and the mark detection device detects the marks of the material 100, the feeding operation of the material 100 is temporarily stopped and then the material 100 is press-formed by means of the press-forming device 10. After the press forming is applied to the prescribed portion of the material 100, the upper and lower molds of the press-forming device 10 are moved away from each other. Then, the material feeding device feeds the material 100 again to move the material to the subsequent steps.

A series of steps of feeding the material 100, detecting the mark and applying the press forming is repeated by the number of marks for indicating the positions to which the press forming is to be applied. The respective press-forming device 10, to which information on the press forming has been given on the basis of the marks, carries out the press forming on the material 100 at the prescribed intervals in its longitudinal direction by the required number of press forming (see FIG. 3). The material 100 has a pattern of irregularities, which have been formed by the respective press-forming device, so as to be placed side by side in the longitudinal direction of the material 100 (see FIG. 4).

After the series of press forming steps by means of the respective press-forming device 10 is completed, the transferring device 20, which is disposed on the downstream side of the press-forming device 10, moves the material 100 in its traveling direction to discharge it from the press-forming device 10.

Immediately after the material is discharged from the press-forming device 10, the surface of the material 100 is imaged by means of the appearance inspection device 40. The appearance inspection device 40 inspects existence of flaws due to the press forming on the basis of the image of the surface of the material 100. In a case where no flaws exist, the material 100 is moved to the subsequent steps on the contrary. In a case where the flaws exist, the appearance inspection device 40 gives instructions to the respective devices so as not to carry out the subsequent steps such as the lapping step and the welding step, while continuing the transfer of the material 100. Inspection of the material 100 by means of the appearance inspection device 40 immediately after the press forming makes it possible to prevent an unnecessary working, which would be applied to the material 100 having the flaws, thus avoiding waste. It is also possible to feed reliably the material 100 having no defects such as flaws to the welding device 30, thus improving safety of the heat transfer member 200 as welded.

The transferring device 20, which is provided on the downstream side of the appearance inspection device 40 in the traveling direction of the material 100, holds the flat portions 110 of the material 100 from the opposite sides. The transferring device 20 causes the reversing unit 23 to pick the material 100 from the transferring passage 22 during transferring the material 100, temporarily holding the material 100 in a certain place and turning it over around the rotational axis, which is in parallel with the traveling direction in the transferring passage 22. The material 100 thus turned over is then returned to the transferring passage 22 (see FIG. 5).

After the material 100 is turned over and then subjected to the further transferring operation, the other material 100, which has been newly press-formed by means of the press-forming device 10, is transferred so as to follow the material 100, which has been turned over. The lapping unit 24 on the transferring passage 22 places the material 100, which has been turned over, on the other material 100, which has been newly transferred from the press-forming device 10, so that the flat portions 110 of the two materials 100 come into contact with each other. An operation of turning over the material 100 as previously transferred when the next material is press-formed and transferred, reduces a period of time required from the start of the transferring step to completion of the step for placing the two materials 100 one upon another by means of the lapping unit 24, to a minimum.

In the lapping unit 24, the imaging units 25 disposed above and below the two materials 100 image them in a lapped state to obtain information on the positions of the marks 111 for the positional adjustment of the materials 100 (see FIG. 6). A positional adjustment mechanism of the lapping unit 24 makes a positional adjustment in the right and left sides directions and the upper and lower sides directions of each of the materials 100 so that the respective positions of the marks 111 of the materials 100 coincide with the two prescribed standard positions, which have been previously been set for the two materials 100 to be symmetrical relative to the central line of the transfer passage 22 of the transferring device 20. Accordingly, the two materials 100 can be placed one upon another without causing deviation of the heat transfer faces 120 in the right and left sides directions and the upper and lower side directions of the materials 100 (see FIG. 7).

The holding unit 21 then holds the two materials 100 in which the faces of the heat transfer face each other in an appropriate manner, and the transferring device 20 moves the two materials 100 together with the holding unit 21 to the welding device 30 for carrying out the next step.

After the mark detection device detects the marks defining the positions of the materials to which the welding is to be applied, the welding device 30 carries out simultaneously the spot-welding on a plurality of positions of the flat members 110 of the materials 100, which are defined by the marks to temporarily secure them, and then carries out continuously and longitudinally the seam-welding on the flat members 110 on the inner sides in the transverse direction relative to the temporarily secured positions. Such a welding operation combines the materials 100 together so as to provide the heat transfer member 200 having a tubular shape and the opposite opening ends in the longitudinal direction (see FIG. 8). The welding, which is carried out on the basis of the marks by means of the welding device, makes it possible to properly weld the materials 100 in appropriate positions. The spot-welding, which is previously carried out, makes it possible to carry out accurately the seam-welding on the portions of the materials to be seam-welded, without causing deviation of the materials 100, thus improving accuracy of the shape of the heat transfer member as manufactured.

Immediately after the welding of the materials 100 by means of the welding device 100, the heat transfer member 200 obtained by combining the materials 100 together is transferred to the inspection device 50. The inspection device 50 obtains information on the distribution of temperature of the welded portions of the materials 100 and analyzes the distribution of temperature, to inspect the existence of improperly welded portions. In a case where any improperly welded portions do not exist, the materials are transferred to the pressure test device 60 for carrying out the next step so as to be subjected to the pressure test. On the contrary, in a case where the improperly welded portions exist, the materials are not subjected to the pressure test utilizing the pressure test device 60.

The inspection utilizing the inspection device 50 can be carried out on the basis of only the temperature distribution, which is obtained immediately after the welding. The continuous inspection, which is carried out immediately after the welding, makes it possible to convey immediately the properly finished products to the pressure test device 60, thus permitting a continuous manufacture of the heat transfer members 200. In addition, it is unnecessary to stay the objects to be inspected for a long period of time as in a radiographic inspection device, thus making it possible to complete a rapid inspection to continue manufacture of the heat transfer members.

The pressure test device 60 closes the opposite opening ends of the heat transfer member 2, applies the prescribed pressure to the inside of the heat transfer member 200 and recognizes a pressure proof property up to the prescribed pressure of the heat transfer member 200. In a case where the pressure proof property is recognized, the heat transfer member 200 is judged as the properly finished product. On the contrary, in a case where no pressure proof property is recognized, the heat transfer member 200 is judged as the improperly finished product. More specifically, it is possible to prevent the heat transfer member 200, which has no sufficient pressure proof and scaling properties, from being included in the properly finished products, thus ensuring safety of the products of the heat transfer members 200. The series of manufacturing steps are completed after judgment of the products utilizing the pressure test device 60.

In the method of the embodiment of the present invention for manufacturing the heat transfer members, the press-forming device 10 carries out the press forming on the elongated materials 100, the transferring device 20 places the two materials 100 one upon another, which have been conveyed from the press-forming device 10 to the transferring device 20, while holding the flat members 110 of the materials 100 and conveying them, and then transfers them to the welding device 30, and the welding device 30 welds the flat members 110 together to form the heat transfer member 200. It is therefore possible to continuously apply the series of steps from the pressing step to the welding step to the materials 100 to manufacture continuously and automatically the heat transfer members 200, thus remarkably improving the manufacturing efficiency and reducing the manufacturing cost for the heat transfer members 200. In addition, even when the elongated materials 100 to be worked have a large size, it is possible to weld the materials 100 in a lapped state in a reliable manner to form the heat transfer member 200. Accordingly, it is possible to manufacture easily a heat exchanger, which has the large heat transfer member to enhance the heat exchanger effectiveness.

In the above-described method of embodiment of the present invention for manufacturing the heat transfer member, the welding device 30 carries out simultaneously the spot-welding on a plurality of positions of the flat members 110 of the materials 100, which are defined by the marks to temporarily secure them. The present invention is not limited only to such an embodiment, and the spot-welding may be successively applied to a certain group of positions to which the spot-welding is to be applied. In such a case, it is possible to minimize the number of the spot-welding mechanisms of the welding device 30, thus reducing the cost of the welding device 30.

According to the present invention as described in detail the press forming is applied to the longitudinally extending central portion of the elongated material to be worked by means of the press-forming device, while forming the flat members on the longitudinally extending opposite edge portions of the material. The transferring device holds the flat members of the two materials, which have been subjected to the press forming, and transfers them to the welding device, while placing them one upon another in an appropriate manner. The flat members of the two materials are then welded by means of the welding device to form the heat transfer member. Continuous application of a series of steps from the press forming step to the welding step to the materials to be worked makes it possible to automatically and continuously manufacturing the heat transfer members, thus remarkably improving the manufacturing efficiency and reducing the manufacturing cost for the heat transfer members. In addition, even when the elongated materials to be worked have a large size, it is possible to transfer them to the welding device in a reliable manner. Accordingly, it is possible to manufacture easily a heat exchanger, which has the large heat transfer member to enhance the heat exchanger effectiveness. The materials to be worked are temporarily secured to each other and then welded by means of the welding device. It is therefore possible to prevent deviation of the positions to be welded, perform an accurate welding and improve accuracy of the shape of the heat transfer member after being welded.

In the present invention, the two materials, which have been press-formed by means of the same press-forming device, conveyed to the transferring device, and then placed one upon another, are used as a set of materials to be worked, which are to be welded together to form the heat transfer member. Accordingly, there may be used a combination of the single press-forming device and the single transferring device. It is therefore unnecessary to use a plurality of press-forming devices, thus reducing the manufacturing cost. Use of the materials to be worked, which have been press-formed by means of the same press-forming device, makes the difference in the shape of the materials to be worked remarkably small, thus improving accuracy of the shape of the heat transfer member as manufactured.

In the present invention, any one of the two materials, which have been press-formed by means of the same press-forming device, and then conveyed to the transferring device, is turned over by means of the turning device to provide an inversed relationship of the opposite surfaces and moved in a parallel direction in such a state to a position in which it can be placed on the other material. The two materials are then placed one upon another. It is therefore possible to place the two materials one upon another without changing the facing direction of the other material, thus permitting the simplification of a mechanism for placing the materials to be worked one upon another. In a case where the material as temporarily held is turned over, it is possible to turn over the material when the next material is press-formed and transferred, reducing a period of time required to place the two materials one upon another. Consequently, it is possible to reduce a period of time required to transfer the materials from the press-forming device to the welding device, thus permitting manufacture of the heat transfer member in a short period of time.

In the present invention, the marking device puts the mark in the prescribed position on the flat member of the material prior to the press forming by means of the press-forming device. The imaging unit of the transferring device takes an image of the two materials, which have been placed one upon another by means of the transferring device, to obtain information on the positions of the marks. The positional adjustment of the materials is made so that the positions of the marks coincide with the standard positions as previously set. Accordingly, the materials can be placed one upon another without causing deviation of the heat transfer faces. Namely, it is possible to place the two materials one upon another in an appropriate positional relationship during transfer of the materials from the press-forming device to the welding device. It is therefore possible to convey the materials as placed to the welding device so as to carry out a proper welding operation, thus improving accuracy of the shape of the heat transfer member. In addition, the proper positional adjustment can be made by merely causing the positions of the marks to coincide with the standard positions. Consequently, a positional adjustment can be made rapidly to reduce a period of time required to transfer the materials from the press-forming device to the welding device, thus permitting manufacture of the heat transfer member in a short period of time.

In the present invention, the marking device puts the marks for indicating the positions to be welded, prior to the welding. The mark detection device detects the marks, while the welding device operates to weld the materials in accordance with the detected marks. After the spot-welding is applied to the portions of the materials, on which the marks have been put, the seam-welding is applied to the materials without forming any gap between them. Consequently, the welding device can operate to weld the materials in the prescribed portions on the basis of the obtained information on the positions of the materials, which are to be welded, thus permitting a precise adjustment of the welding positions. The materials are temporarily secured to each other and then spot-welded so as to conduct accurately the next step for seam-welding them in appropriate positions, thus improving accuracy of the shape of the heat transfer member after being welded.

In the present invention, the appearance inspection device inspects for the existence of flaws due to the press forming, immediately after press forming the material with the use of the press-forming device. When the flaws are inspected, no further steps are applied to the materials so as to avoid a case where the heat transfer member is identified as a failed product due to flaws, which are found out after the welding of the materials by means of the welding device, resulting in waste of the materials. It is possible to supply the materials, which have no defects such as flaws, to the welding device, thus preventing the defects from being erroneously left on the heat transfer member and ensuring safety.

In the present invention, the inspection device obtains information on the distribution of temperature of the welded portions of the materials to inspect the existence of improperly welded portions. When the improperly welded portions are inspected, any further subsequent steps are not carried out so as to prevent the heat transfer member, which has been welded in an improper manner, from being erroneously supplied to the subsequent step. Accordingly, only the heat transfer members, which have been welded in a proper manner, can be conveyed to the subsequent steps, thus ensuring safety of the product. In addition, obtainment of the distribution of temperature suffices to make a rapid inspection, thus making it unnecessary to stay the objects to be inspected for a long period of time as in a radiographic inspection device, and reducing remarkably the period of time required for manufacture of the heat transfer member.

In the present invention, there is provided a state in which the prescribed pressure is applied to the inside of the heat transfer member, which has been judged to be proper on the basis of the inspection by means of the above-mentioned inspection device. The pressure proof property of the heat transfer member is checked with the use of the pressure test device. When the sufficient pressure proof property is not recognized, the heat transfer member is judged as a failed product so as to prevent the heat transfer member, which has not a sufficient pressure resistance and a sufficient sealing property due to improper manufacturing steps, from being supplied as a finished product. It is therefore possible to provide only the heat transfer members, which satisfy the requirements for the finished product, thus ensuring safety of the product.

What is claimed is:

1. A method for manufacturing a heat transfer member comprising the steps of: subjecting elongated materials to be worked, which are made of metallic thin sheets, to a continuous press forming utilizing a plurality of press-forming devices to form heat transfer faces each having a prescribed shape, while transferring the materials in a prescribed feeding direction, which is in parallel with a longitudinal direction of the materials; and welding two materials, which have been subjected to the press forming, of said elongated materials together utilizing a welding device to form a heat transfer member having substantially a tubular shape, wherein: said method further comprising the steps of: forming flat members each having a prescribed width on longitudinally extending opposite edge portions of said materials to be worked so as to make a difference in level from a longitudinally extending central portion thereof by means of each of said press-forming devices; placing the two materials one upon another so that the flat members of the two materials come into contact with each other, while holding said flat members of the two materials and transferring the two materials, which have been placed one upon another without causing deviation of the heat transfer face, to a next step with a use of a transferring device, which is provided after said press-forming devices; and temporarily securing the flat members of the two materials, which have been placed one upon another, at a plurality of positions, and then, welding continuously and longitudinally said flat members on inner sides, defining the sides in between the edge portions and the temporarily secured positions, in a transverse direction relative to temporarily secured positions to combine the two materials together, with a use of said welding device, thereby forming the heat transfer member having the tubular shape and opposite opening ends in a longitudinal direction.

2. The method as claimed in claim 1, wherein: said transferring device transfers the material, which has been subjected to the press forming utilizing the press-forming device, from the press-forming devices, temporarily holds it in a certain place, transfers a new material which has been subjected to the press forming utilizing said press-forming device after the press forming of said material and then places the material as temporarily held and the new material one upon another so that the flat members of the materials come into contact with each other.

3. The method as claimed in claim 2, wherein: said transferring device turns any one of the material as temporarily held and the new material utilizing a turning device, and then places the two materials one upon another with one of them turned over.

4. The method as claimed in any one of claims 1 to 3, wherein: a marking device puts a prescribed mark in at least one prescribed position on a surface of a prescribed region of the flat member of said material so as to provide a relative positional relationship to a portion of each of the materials, to which the press forming is to be applied, prior to the press forming of the material utilizing said press-forming device; and said transferring device is provided with an imaging unit for imaging opposite outer surfaces of the materials, which have been placed one upon another, said transferring device causing said imaging unit to image the two materials, which have been placed one upon another, making a positional adjustment of each of the materials, while obtaining positions of said mark, and placing the two materials one upon another without causing deviation of the heat transfer faces so that the positions of said marks of the materials coincide with two prescribed standard positions, which have previously been set for the two materials to be symmetrical relative to a central line of a transfer passage of the transferring device.

5. The method as claimed in any one of claims 1 to 3, further comprising the steps of:

putting a plurality of prescribed marks, which define welding positions of the materials, on the surface of the materials, with a use of a marking device, prior to welding of the materials with the use of said welding device; and applying, after detection of the marks of the materials to be transferred utilizing a mark detection device, spot-welding to prescribed portions of the materials, which are defined by the marks, to temporarily secure the materials, and then applying seam-welding to prescribed portions on the inner sides of the flat members in the transverse direction relative to spot-welded portions, with the use of said welding device.

6. The method as claimed in any one of claims 1 to 3, further comprising the steps of:

inspecting existence of flaws due to the press forming from an image of the surface of the material, utilizing an appearance inspection device, immediately after press forming the material with the use of the press-forming device, conducting subsequent steps for the material in a case where no flaws are inspected, and stopping the steps of placing the materials one upon another and welding them in a case where the flaws are inspected.

7. The method as claimed in any one of claims 1 to 3, further comprising the steps of:

immediately after welding the materials with the use of the welding device, obtaining distribution of the welded portions of the materials and analyzing the distribution of temperature utilizing an inspection device, to inspect existence of improperly welded portions, conducting subsequent steps for the material in a case where no improperly welded portions are inspected, and stopping the subsequent steps for the material in a case where the improperly welded portions are inspected.

8. The method as claimed in claim 7, further comprising the steps of: inspecting the materials with the use of the inspection device, closing, after obtainment of inspection results of no improperly welded portions of the materials, the opposite opening ends of the heat transfer member formed of the materials and applying a prescribed pressure to an inside of the heat transfer member, and recognizing a pressure proof property up to a prescribed pressure of the heat transfer member with a use of a pressure test device, judging the heat transfer member as a good product in case where the pressure proof property is recognized, and judging the heat transfer member as a failed product in a case where the pressure proof property is not recognized.

9. The method as claimed in claim 4, further comprising the steps of:

putting a plurality of prescribed marks, which define welding positions of the materials, on the surface of the materials, with a use of a marking device, prior to welding of the materials with the use of said welding device; and applying, after detection of the marks of the materials to be transferred utilizing a mark detection device, spot-welding to prescribed portions of the materials, which are defined by the marks, to temporarily secure the materials, and then applying seam-welding to prescribed portions on the inner sides of the flat members in the transverse direction relative to spot-welded portions, with the use of said welding device.

10. The method as claimed in claim 4, further comprising the steps of:

inspecting existence of flaws due to the press forming from an image of the surface of the material, utilizing an appearance inspection device, immediately after press forming the material with the use of the press-forming device, conducting subsequent steps for the material in a case where no flaws are inspected, and stopping the steps of placing the materials one upon another and welding them in a case where the flaws are inspected.

11. The method as claimed in claim 5, further comprising the steps of:

inspecting for the existence of flaws due to the press forming from an image of the surface of the material, utilizing an appearance inspection device, immediately after press forming the material with the use of the press-forming device, conducting subsequent steps for the material in a case where no flaws are inspected, and stopping the steps of placing the materials one upon another and welding them in a case where the flaws are inspected.

12. The method as claimed in claim 9, further comprising the steps of:

inspecting for the existence of flaws due to the press forming from an image of the surface of the material, utilizing an appearance inspection device, immediately after press forming the material with the use of the press-forming device, conducting subsequent steps for the material in a case where no flaws are inspected and stopping the steps of placing the materials one upon another and welding them in a case where the flaws are inspected.

13. The method as claimed in claim 4, further comprising the steps of:

immediately after welding the materials with the use of the welding device, obtaining distribution of temperature of the welded portions of the materials and analyzing the distribution of the utilizing an inspection device, to inspect existence of improperly welded portions, conducting subsequent steps for the material in a case where no improperly welded portions are inspected, and stopping the subsequent steps for the material in a case where the improperly welded portions are inspected.

14. The method as claimed in claim 5, further comprising the steps of:

immediately after welding the materials with the use of the welding device, obtaining distribution of temperature of the welded portions of the materials and analyzing the distribution of temperature utilizing an inspection device, to inspect existence of improperly welded portions, conducting subsequent steps for the material in a case where no improperly welded portions are inspected, and stopping the subsequent steps for the material in a case where the improperly welded portions are inspected.

15. The method as claimed in claim 6, further comprising the steps of:

immediately after welding the materials with the use of the welding device, obtaining distribution of temperature of the welded portions of the materials and analyzing the distribution of temperature utilizing an inspection device, to inspect existence of improperly welded portions, conducting subsequent steps for the material in a case where no improperly welded portions are inspected, and stopping the subsequent steps for the material in a case where the improperly welded portions are inspected.

16. The method as claimed in claim 12, further comprising the steps of:

immediately after welding the materials with the use of the welding device, obtaining distribution of temperature of the welded portions of the materials and analyzing the distribution of temperature utilizing an inspection device, to inspect existence of improperly welded portions, conducting subsequent steps for the material in a case where no improperly welded portions are inspected and stopping the subsequent steps for the material in a case where the improperly welded portions are inspected.

17. The method as claimed in claim 4, comprising the steps of: inspecting the materials with the use of the inspection device, closing, after obtainment of inspection results of no improperly welded portions of the materials, the opposite opening ends of the heat transfer member formed of the materials and applying a prescribed pressure to an inside of the heat transfer member, and recognizing a pressure proof property up to a prescribed pressure of the heat transfer member with a use of a pressure test device, judging the heat transfer member as a good product in a case where the pressure proof property is recognized and judging the heat transfer member as a failed product in a case where the pressure proof property is not recognized.

18. The method as claimed in claim 5, comprising the steps of: inspecting the materials with the use of the inspection device, closing, after obtainment of inspection results of no improperly welded portions of the materials, the opposite opening ends of the heat transfer member formed of the materials and applying a prescribed pressure to an inside of the heat transfer member, and recognizing a pressure proof property up to a prescribed pressure of the heat transfer member with a use of a pressure test device, judging the heat transfer member as a good product in a case where the pressure proof property is recognized, and judging the heat transfer member as a failed product in a case where the pressure proof property is not recognized.

19. The method as claimed in claim 6, comprising the steps of: inspecting the materials with the use of the inspection device, closing, after obtainment of inspection results of no improperly welded portions of the materials, the opposite opening ends of the heat transfer member formed of the materials and applying a prescribed pressure to an inside of the heat transfer member, and recognizing a pressure proof property up to a prescribed pressure of the heat transfer member with a use of a pressure test device, judging the heat transfer member as a good product in a case where the pressure proof property is recognized, and judging the heat transfer member as a failed product in a case where the pressure proof property is not recognized.

20. The method as claimed in claim 16, comprising the steps of: inspecting the materials with the use of the inspection device, closing, after obtainment of inspection results of no improperly welded portions of the materials, the opposite opening ends of the heat transfer member formed of the materials and applying a prescribed pressure to an inside of the heat transfer member, and recognizing a pressure proof property up to a prescribed pressure of the heat transfer member with a use of a pressure test device, judging the heat transfer member as a good product in a case where the pressure proof property is recognized, and judging the heat transfer member as a failed product in a case where the pressure proof property is not recognized.

* * * * *